United States Patent Office 2,788,865
Patented Apr. 16, 1957

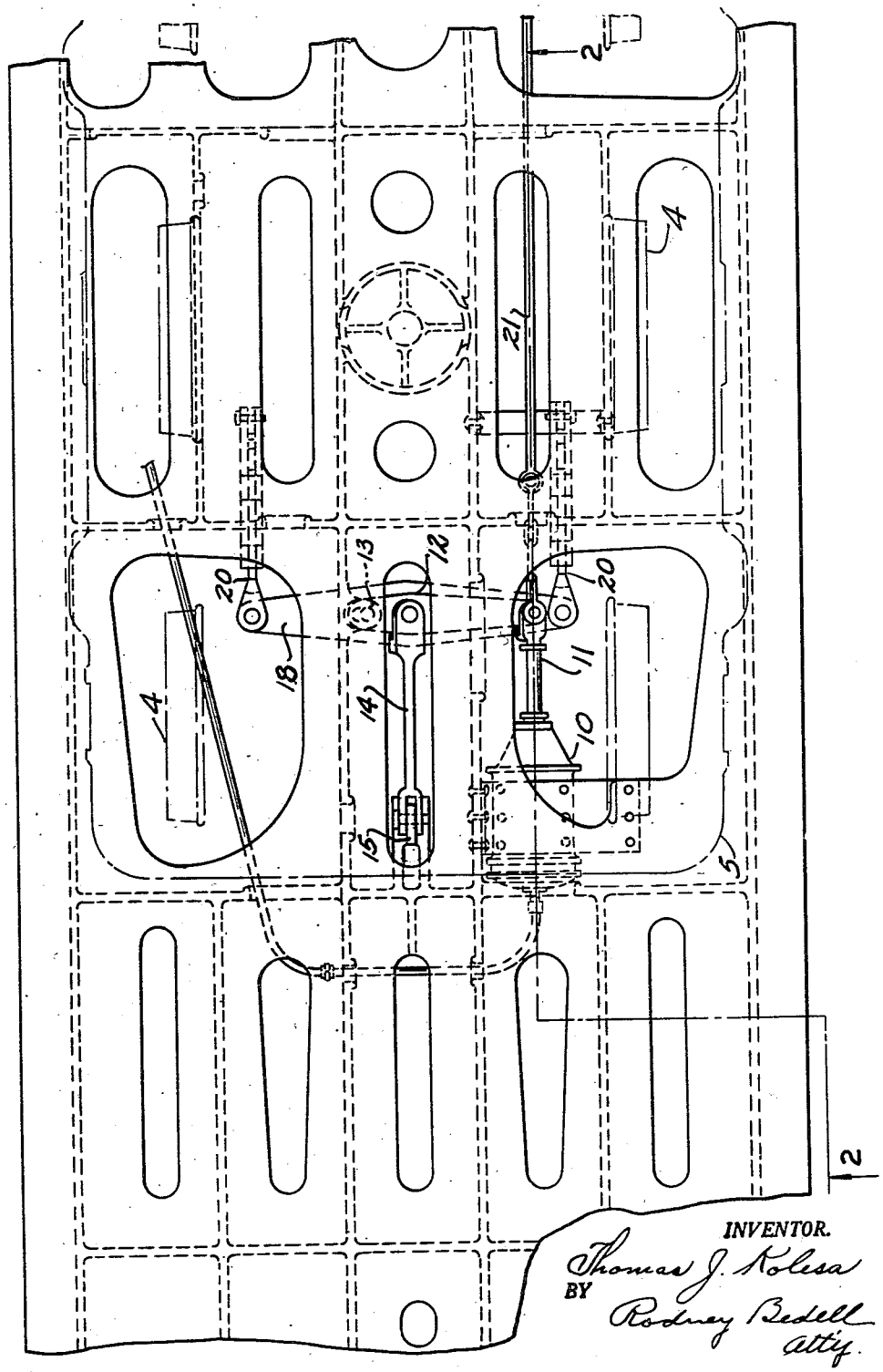

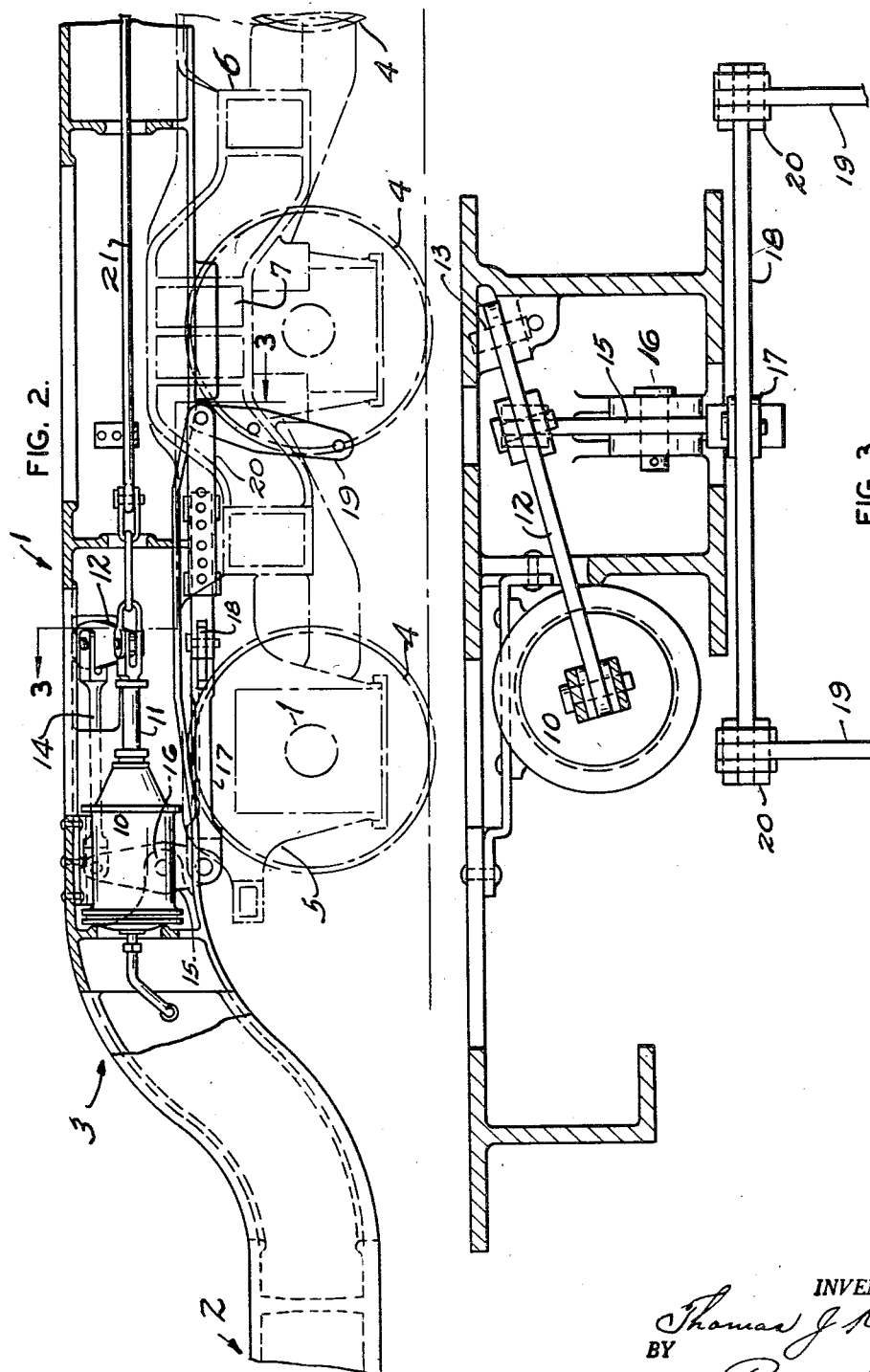

2,788,865

RAILWAY VEHICLE FOUNDATION BRAKE GEAR

Thomas J. Kolesa, Edwardsville, Ill., assignor to General Steel Castings Corporation, Granite City, Ill., a corporation of Delaware Application April 16, 1952, Serial No. 282,623

6 Claims. (Cl. 188—33)

The invention relates to brake gear and associated vehicle framing and is particularly adapted for a railway car of the depressed center type in which the underframe has elevated end portions extending over the car trucks and a lower depressed portion extending between the trucks.

The main object of the invention is to mount an air brake cylinder and associated levers and pull rods on the elevated end portion of the underframe, but below the top thereof, in a manner to avoid interference with the wheels, truck frame, truck bolster, truck brake rigging or other truck parts, especially if the floor height of the end portion of the underframe above the track and the depth of this portion of the underframe is limited.

This and other detailed objects of the invention are attained by the structure illustrated in the accompanying drawings, in which:

Figure 1 is a plan view of an end portion of a car of the type described.

Figure 2 is a vertical section and elevation taken approximately on the line 2—2 of Figure 1.

Figure 3 is a vertical transverse section taken approximately on the line 3—3 of Figure 2.

The vehicle includes an underframe, preferably of cast steel, with relatively high end portions 1, only one of which is shown, and a relatively low middle portion 2, and inclined portions 3, merging with the adjacent ends of portions 1 and 2. Preferably the relatively low middle portion 2 and inclined portions 3 comprise extensions of the longitudinal sill members of the relatively high end portions, each of which is mounted upon a six-wheel truck indicated by the wheels 4, frame 5, and bolster 6 which include a center plate 7 supporting the vehicle body.

In such a car, the relatively low level middle portion 2 of the underframe is too close to the rail to permit the mounting thereon of brake cylinders, levers, and pull rods between the trucks, as is customary in railway cars, and the mounting of the brake gear on the relatively high level end portion without positioning the brake cylinder above the underframe, as may be done on hopper cars and tank cars, without unduly shortening or distorting the levers, creates a problem in the positioning of the parts.

This problem is solved by mounting the air brake cylinder 10 near one end of the relatively high end portion and beneath the top thereof, connecting the end of the cylinder piston rod 11 to the cylinder lever 12 which is inclined upwardly from the piston rod to near the top of the underframe, where it is fulcrumed at 13, associating therewith a pull rod 14 extending alongside or abreast of cylinder 10 with one end connected to lever 12 and with its other end connected to the upper end of an upright lever 15, also substantially abreast of the cylinder, fulcrumed at 16 on the lower portion of the underframe and extending below the level of the underframe with its lower end connected to a pull rod 17 extending towards the end of the underframe for connection to truck brake gear which preferably includes an equalizing lever 18 extending transversely of the vehicle beneath and substantially in a vertical plane with cylinder lever 12.

Lever 18 may be connected by pull rods 20 to truck brake live levers as indicated at 19 and through the latter to other truck brake gear, as disclosed in a co-pending application filed by James C. Travilla and Joseph B. Harley filed April 16, 1952, Serial No. 282,640, now Patent No. 2,738,035.

It will be understood that necessary air reservoirs, piping, and similar equipment (not shown) will be associated with the brake gear illustrated in the drawings, but such eqiupment does not form part of the present invention.

The essential cylinder, levers, and pull rods shown and described make possible an efficient body-mounted brake gear of relatively few parts and of light weight adapted for application to a shallow underframe without interference with any truck parts or with hand brake rigging, as indicated at 21 and without interfering with or restricting the positioning of the air reservoir near the end of the underframe, as would be the case if both the brake cylinder and the air reservoir were located near the end of the underframe as in previous depressed center cars having a higher floor and deeper underframe members.

The structure attains the general objects set forth in the introductory portions of this specification, but the details of the structure may be varied substantially without departing from the spirit of the invention and the exclusive use of those modifications coming within the scope of the claims is contemplated.

What is claimed is:

1. In combination with a railway car having a truck and having an underframe with a relatively high end portion extending over and mounted on the truck and with a relatively low middle portion extending lengthwise of the car to a point adjacent to the truck, an air brake cylinder and piston mounted on the relatively high portion of the underframe near the relatively low portion of the underframe, a piston rod projecting from the cylinder towards the adjacent end of the underframe, a lever connected to said piston rod and extending transversely of and fulcrumed on the underframe, a pull rod connected to said lever and extending therefrom longitudinally of the underframe and alongside the cylinder, a lever fulcrumed on the relatively high portion of the underframe and extending downwardly below the level of said cylinder and connected at its upper end to said pull rod, and a pull rod connected to the lower end of said latter-mentioned lever and extending therefrom below said underframe and towards the adjacent end of the underframe for operative connection to truck brake gear.

2. In combination with a railway car having a truck and having an underframe including a relatively high center sill portion mounted on the truck and including a relatively low middle portion extending lengthwise of the car to a point adjacent to the truck and including an inclined portion merging with said relatively high and low portions, an air brake cylinder and piston carried by the underframe at one side of said center sill high portion near said inclined portion, a piston rod projecting from the cylinder towards the adjacent end of the underframe, a lever having one end connected to said piston rod and extending transversely of the underframe through said center sill high portion and having its other end fulcrumed on the underframe, a pull rod connected to said lever and extending therefrom longitudinally of the underframe between the sides of said center sill high portion abreast of the cylinder, a lever fulcrumed on said center sill high portion and extending downwardly therefrom with its upper end connected to said pull rod, and means for operatively connecting the lower end of said latter-mentioned lever to truck brake gear.

3. In combination with a railway vehicle underframe having a low level middle section and an elevated end portion constructed for support upon a swivel truck, an air brake cylinder and piston mounted on said underframe between the top and bottom faces thereof, a piston rod extending horizontally from said cylinder, a lever pivoted at one end to said piston rod and inclined therefrom upwardly with its other end fulcrumed on the underframe near the top thereof but below its upper face, a pull rod connected to said lever intermediate the ends of the latter and extending alongside the cylinder beneath the top of the underframe, an upright lever fulcrumed on the lower part of said portion with its upper end connected to said pull rod and with its lower end below the underframe, and a pull rod connected to the lower portion of said latter-mentioned lever and extending substantially horizontally beneath the underframe for operative connection to a truck brake gear.

4. In a railway vehicle frame and brake gear assembly, an air brake cylinder mounted on the frame with a piston having a rod extending from one end of the cylinder, a lever extending transversely of the frame and fulcrumed on the frame and connected to the outer end of the piston rod, a pull rod connected at one end to said lever and extending therefrom alongside the cylinder, a lever fulcrumed on the frame and connected to the other end of said pull rod and extending downwardly therefrom and abreast of said cylinder, a pull rod connected to the lower portion of said latter-mentioned lever, and an equalizing lever substantially directly below said first-mentioned lever and connected intermediate its ends to said latter-mentioned pull rod.

5. In combination with a railway car having a truck and having an underframe including a relatively high level center sill end portion mounted on the truck and a relatively low level center sill middle portion, extending lengthwise of the car to a point adjacent to the truck, and an inclined portion merging with said relatively high and low level portions, an air brake cylinder and piston carried by the underframe at one side of said center sill end portion near said inclined portion, a piston rod projecting from the cylinder towards the adjacent end of the underframe, a lever having one end connected to said piston rod and extending transversely of the underframe through said center sill end portion and having its other end fulcrumed on the underframe, a pull rod connected to said lever and extending therefrom longitudinally of the underframe between the sides of said center sill end portion abreast of the cylinder, a lever fulcrumed on said center sill end portion and extending downwardly therefrom with its upper end connected to said pull rod, a pull rod connected at one end to the lower end of said latter-mentioned lever and extending therefrom towards the adjacent end of the underframe, and an equalizing lever connected intermediate its ends to said latter-mentioned pull rod and extending transversely of the underframe beneath said first-mentioned lever.

6. In a railway vehicle structure, a vehicle body underframe, a center plate projecting downwardly therefrom for supporting the underframe upon a swiveling truck, an air brake cylinder mounted on the frame above the level of the center plate and provided with a piston having a rod extending from one end of the cylinder, the axis of said cylinder and piston rod being disposed horizontally, a substantially horizontal lever with one end having a fixed fulcrum on the frame at one side of the cylinder and piston axis and connected directly to the outer end of the piston rod, a pull rod connected at one end to said lever intermediate the ends of the latter and extending therefrom alongside the cylinder, a lever fulcrumed on the frame and connected to the other end of said pull rod and extending downwardly therefrom at the side of the cylinder, and a pull rod connected to the lower end of the latter mentioned lever and extending longitudinally of the frame at the level of said center plate, there being an equalizer lever pivoted on the latter mentioned pull rod at the side of the center plate and arranged for connection to truck brake gear.

References Cited in the file of this patent

UNITED STATES PATENTS

| 758,391 | Shelton | Apr. 26, 1904 |
| 2,028,623 | Redford | Jan. 21, 1936 |
| 2,216,093 | Orr | Sept. 24, 1940 |
| 2,258,337 | Mueller | Oct. 7, 1941 |
| 2,546,232 | Owens | Mar. 27, 1951 |